(12) United States Patent
Nöbauer et al.

(10) Patent No.: US 10,374,959 B2
(45) Date of Patent: Aug. 6, 2019

(54) METHOD FOR TRANSMITTING DATA IN A PACKET-ORIENTED COMMUNICATIONS NETWORK AND CORRESPONDINGLY CONFIGURED USER TERMINAL IN SAID COMMUNICATIONS NETWORK

(71) Applicant: CONTINENTAL AUTOMOTIVE GMBH, Hannover (DE)

(72) Inventors: Josef Nöbauer, Neukirchen-Balbini (DE); Helge Zinner, Magdeburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/400,510

(22) PCT Filed: Apr. 30, 2013

(86) PCT No.: PCT/EP2013/058974
§ 371 (c)(1),
(2) Date: Nov. 11, 2014

(87) PCT Pub. No.: WO2013/167424
PCT Pub. Date: Nov. 14, 2013

(65) Prior Publication Data
US 2015/0131443 A1    May 14, 2015

(30) Foreign Application Priority Data
May 11, 2012   (DE) .................. 10 2012 207 952

(51) Int. Cl.
*H04L 12/56* (2006.01)
*H04L 12/851* (2013.01)
(Continued)

(52) U.S. Cl.
CPC .............. *H04L 47/24* (2013.01); *H04L 47/12* (2013.01); *H04L 65/602* (2013.01); *H04L 65/80* (2013.01)

(58) Field of Classification Search
CPC ........................... H04L 47/56; H04L 49/9094
(Continued)

(56) References Cited

U.S. PATENT DOCUMENTS 8,060,615 B2 * 11/2011 Finn ...................... H04L 12/462
709/204
8,171,152 B2 * 5/2012 White .................. H04L 43/0858
709/223

(Continued)

FOREIGN PATENT DOCUMENTS

CN       102239668      11/2011
EP       1 193 920      4/2002
(Continued)

OTHER PUBLICATIONS

Holzinger et al., "Realtime Linear Audio Distribution over Networks: A Comparison of Layer 2 and 3 Solutions using the example of Ethernet Avband Ravenna", Nov. 18-20, 2011, pp. 1-9.
(Continued)

*Primary Examiner* — Dmitry Levitan
(74) *Attorney, Agent, or Firm* — Cozen O'Connor

(57) ABSTRACT

A method for transmitting data in a packet-oriented communications network, in particular of a motor vehicle, with a guaranteed maximum transmission time for the data packets in the communications network, and to a user terminal for carrying out said method. According to the method, before the data transmission a specific quality of service is reserved by a reservation request from the sender of the data to the receiver of the data. The reservation request including the data rate of the data stream and the latency as parameters
(Continued)

of the requested quality of service. Once the reservation request is confirmed, the requested quality of service for the communication link between the sender and the receiver is guaranteed in the network for the data stream. In addition, the quality of service for the data stream is adjusted by the sender on the basis of the topology of the communication network and/or the resources of the communication link.

12 Claims, 4 Drawing Sheets

(51) Int. Cl.
*H04L 29/06* (2006.01)
*H04L 12/801* (2013.01)

(58) Field of Classification Search
USPC .............................. 370/390, 394, 422, 425
See application file for complete search history.

(56) References Cited

U.S. PATENT DOCUMENTS

| 8,838,787 | B2* | 9/2014 | Gelter | H04N 21/64738 |
| | | | | 709/224 |
| 2010/0080111 | A1 | 4/2010 | Diab et al. | |
| 2012/0036513 | A1 | 2/2012 | Choong | |
| 2013/0003757 | A1* | 1/2013 | Boatright | H04J 3/0697 |
| | | | | 370/474 |
| 2013/0138800 | A1* | 5/2013 | Gelter | H04L 12/1881 |
| | | | | 709/224 |

FOREIGN PATENT DOCUMENTS

| WO | WO 2006/110960 | 10/2006 |
| WO | WO 2008/101112 | 8/2008 |

OTHER PUBLICATIONS

Gunther et al., "Draft IEEE Standard for Local and Metropolitan area Networks—Virtual Bridged Local Area Networks—Amendment 9: Stream Reservation Protocol (SRP)", Aug. 5, 2008, 56 pages.
Kern et al., "Accuracy of Ethernet AVB Time Synchronization Under Varying Temperature Conditions for Automotive Networks", Jun. 5, 2011, pp. 597-602.
Standards Activities Department, "Draft Standard for Layer 2 Transport Protocol for Time Sensitive Applications in Bridged Local Area Networks", Aug. 25, 2008, 84 pages.
Standards Association, "IEEE Standard for Layer 2 Transport Protocol for Time-Sensitive Applications in Bridged Local Area Networks", May 6, 2011, 57 pages.
English translation of an Office Action dated Jul. 29, 2016 which issued in the corresponding Chinese Patent Application No. 201380024538.X.

* cited by examiner

METHOD FOR TRANSMITTING DATA IN A PACKET-ORIENTED COMMUNICATIONS NETWORK AND CORRESPONDINGLY CONFIGURED USER TERMINAL IN SAID COMMUNICATIONS NETWORK

CROSS REFERENCE TO RELATED APPLICATIONS

This is a U.S. national stage of application No. PCT/EP2013/058974, filed on Apr. 30, 2013. Priority is claimed on German Application No.: DE102012207952.1 filed May 11, 2012, the content of which are incorporated herein by reference.

BACKGROUND OF THE INVENTION

1. Field of the Invention

The invention relates to a method for transmitting data in a packet-oriented communications network with a guaranteed maximum transmission time for the data packets in the communications network, in particular in the communications network of a motor vehicle. Within the scope of this method, provision is made for a certain quality of service to be reserved, before data transmission, using a reservation request from the sender of the data to one or more recipients of the data, the reservation request comprising, parameters of the requested quality of service, in particular the data rate of the data stream and the latency, that is to say the maximum guaranteed transmission time, possibly in addition to further parameters.

2. Description of the Prior Art

Latency and transmission times, in particular, play a significant role when transmitting time-critical data in a communications network, which is also referred to as network for short and may be, in particular, an Ethernet network according to an Ethernet transport protocol. In this context, the new Ethernet Audio Video Bridging (AVB) standard (IEEE 802.1BA) is being examined with increasing interest for use in motor vehicles, which standard, in contrast to a standard Ethernet transport protocol, can provide guarantees for the maximum transmission time of data packets.

Ethernet AVB data can be transmitted using the IEEE 1722 or the IEEE 1733 transport protocol, in which case an Ethernet AVB network is also referred to as an AVB cloud inside which the guarantees are issued. Within the scope of the standard Ethernet AVB configuration two network nodes, which are referred to as the sender and the recipient and between which data is exchanged, can be at most 7 hops apart inside such an AVB cloud. In this case, the transmission of the data stream from one subscriber device to a next subscriber device in the communications network is referred to as a hop. The subscriber devices are able to be not only the sender and the recipient of the data stream but also buffers, which are referred to as switches, to receive and buffer a data stream and emit the data stream again for forwarding to the actual recipient, in which case each hop naturally costs transmission time. For this reason, a maximum of 7 such intermediate transmissions up to the final recipient are allowed within the Ethernet AVB standard.

Before the data is transmitted via a special communication connection, also called a communication route or path, a certain quality of service of the communication connection, in particular its latency and data rate, is reserved using a reservation request from the sender to the recipient. For this purpose, within the scope of the Ethernet AVB standard, so-called MSRP messages (Multiple Stream Reservation Protocol) are transmitted by the IEEE 802.1Qat protocol from the sender, referred to as the talker, to the recipient, referred to as the listener, via a maximum of 6 switches, that is to say 7 hops. These reservation requests, which are also referred to as signaling messages, also contain, in addition to parameters for the data rate of the data stream, a so-called AVB or QoS class, in which case two classes (class A and class B) are provided within the scope of the Ethernet AVB standard. Class A guarantees a maximum transmission time (latency) from the sender to the recipient of 2 ms. In contrast, class B guarantees a maximum transmission time of 50 ms. Further classes are currently not provided in the standard.

The emitted reservation requests are forwarded, via the switches, to the recipient, which processes the reservation request and confirms it in the case of a positive check. The confirmation of the reservation request is then returned by the sender, via the switches, to the recipient. which then emits the data according to the quality of service requested in the reservation request.

Depending on the AVB class, a usage time (presentation time) is associated with the actual data in the data packet used for data transmission in the header of the data packet and is concomitantly transmitted, which usage time, depending on the class, contains the time at which a recipient can evaluate the data, which time is determined in the synchronized AVB Ethernet communications network. In this case, the maximum transmission time stipulated depending on the class is taken into account, with the result that the current system time plus the maximum transmission time depending on the AVB class, that is to say 2 ms for class A or 50 ms for class B, is usually given as the usage time. As a result, within the synchronized communications network, all data received by devices within the AVB cloud can be used at the same time if synchronized operation of a plurality of subscriber devices in the network is required.

Since, depending on the topology of the network and length of the communication connection, that is to say the number of hops in particular, different subscriber devices receive the data packets at different times, the data must be internally buffered until the intended use at the usage time, which, depending on the data type, requires considerable memory in the subscriber devices in the communications network. Since, in contrast to products in typical IT environments, cost-optimized subscriber devices are intended to be used, in particular for use in automobile networks, a large memory is necessary in the subscriber devices, which unnecessarily makes these devices more expensive.

Another matter of expense within the scope of these networks is the communication performance of the switches which receive, buffer and emit the data streams. For this purpose, processing stacks referred to as queues are provided in the switches, into which stacks the data is placed and processed in succession for emission. In order to prioritize the data differently, a plurality of, often four, different queues of different priorities are usually provided in the switches, which queues are given a different amount of transmission time when data is present, with the result that data from the queue with the higher priority is emitted more quickly than data from the queue with lower priority. Data which is processed within the scope of the Ethernet AVB standard usually enter the queue with a higher priority on account of the maximum transmission time guaranteed by the Ethernet AVB standard so that said data is preferably processed before other data. However, the network topology and, in particular, the position of the sender and recipient in the network, which may be a different number of hops away from one another in particular, are not taken into account in this case.

US 2010/0080111 A1 discloses a method for the Ethernet switching of audio/video data using an Ethernet AVB transport protocol, in which the connection length of the audio/video systems is taken into account and the transceivers of the physical layer (PHY) are dynamically configured according to the connection lengths, which are generally short in comparison with conventional Ethernet networks, in order to adapt them to noise in the network which is less severe, in particular in the case of short connection lengths. This configuration makes it possible to use more favorable transceivers. However, the transmission method is based on the respective standards in this case and does not bring any time-saving and/or resource-saving transmission of the data in the network.

WO 2006/110960 A1 describes a method for transmitting digital data, in particular video and/or audio data, via an Ethernet network, the devices participating in the communication being synchronized to a local time. All data packets interchanged via the network are provided with a time stamp, with the result that the data packets can be sorted using the time stamp. It is also possible to delay the playback of the data packets until a common time or to specify particular playback times. Within a QoS service, the synchronization data can preferentially be transported to achieve the fastest possible synchronization over the entire network. However, this may result in problems if the preferred transport paths are overloaded by applications which must not use the preferred transport path at all in order to achieve the latency.

SUMMARY OF THE INVENTION

Against this background, in the case of data transmission of the type mentioned at the outset, an object of the invention is a way of using the communication connections existing within a communications network, in particular a communications network with an Ethernet AVB transport protocol, in a more effective and resource-saving manner.

In this case, provision is made, in particular, for the quality of service of the data stream to be adapted by the sender on the basis of the topology of the network and/or the resources of the communication connection. This means that, before emitting the data stream after receiving a confirmation of a reservation request, the sender checks, on the basis of the conditions of the selected communication connection (route), which quality of service of the data is actually required before the data are emitted to the recipient. This makes it possible to use the limited resources of the communications network in a more effective manner and in a manner adapted to the actual requirements of the specifically selected communication path (route), with the result that the subscriber devices can possibly be equipped with more cost-effective components, that is to say less powerful chips and/or memory modules.

One preferred embodiment of the proposed invention may provide for a usage time to be adapted as the parameter of the quality of service of the data stream, which usage time indicates the time from which the data transmitted in the data stream via the preferably synchronized communications network can be used in the recipient. This usage time can be adapted, according to the invention, to the length of the communication connection between the sender and recipient, in particular, with the result that a processing time (presentation time) which is adapted to the actual transmission time and not to the maximum guaranteed transmission time and requires shorter buffering in the memory of the recipient can be proposed here.

According to one aspect of the invention, the synchronization of the communications network may also be present only in a part of the communications network along the communication connection (route) from the sender to the recipient (that is to say possibly also via the switches for forwarding the data stream). This makes it possible to process data packets emitted to two recipients at the same time, for example, without the entire communications network having to be synchronized and kept synchronous. Naturally, it may also be advantageous, in particular during use in an automobile, to keep the entire communications network synchronous, especially since a manageable number of subscriber devices in the communications network is usually present in a motor vehicle.

As a result of the adaptation of the usage time according to one aspect of the invention, in addition to reducing the required memory in the recipient, it is therefore also possible to shorten the latency caused by the data transmission overall since the further processing time of the data can be flexibly adapted to the communications network without having to wait for the maximum guaranteed transmission time in each case. In particular in the case of short communication connections, that is to say short transmission paths or routes, it is therefore possible to achieve fast data transmission matched to the individual case before the transmitted data is used.

According to one preferred further development of the proposed invention, a quality of service class can be adapted, in particular additionally but also alternatively, as the parameter of the quality of service of the data stream, which class defines, in particular, the type of forwarding of the data stream between the sender and the recipient via the interposed switches, that is to say specifies, in particular, the forwarding speed in the switches. In this case, the quality of service class may be decisive according to one aspect of the invention in terms of which queue with which prioritization the data streams are placed into and forwarded. In this case, the invention may provide for the quality of service class and therefore the prioritization of the data stream to increase with the length of the communication connection for the data stream since the data packets on a long transmission path need longer than data on a short transmission path (route) on account of the physical conditions, with the result that said data on a short transmission path can also be transmitted with lower priority in order to arrive at the recipient within the same transmission time or a comparable transmission time, for example.

In the case of a communication path which is conventional according to one aspect of the invention, provision is made for the communication connection between the sender and the recipient to be effected via at least one switch or possibly a plurality of switches using a respective hop. In this case, a switch receives the data stream, places it in a queue in the switch according to a prioritization, which is defined by the quality of service class, for example, the data stream being stored in an internal memory of the switch, in particular, for further processing, and emits this data stream again when processing the queue.

In this case, the invention now proposes that the switch inserts information relating to the network topology and/or the resources of the switch into the reservation request emitted by the sender and/or into the confirmation of the reservation request by the recipient, with the result that this information relating to the network topology and/or the resources of the switch or of each switch used along the communication path is transmitted to the sender with the confirmation of the reservation request, the sender then accordingly adapting the quality of service of the data stream on the basis of the transmitted information relating to the network topology and/or the resources of the switch(es) before emitting the data. Therefore, the sender respectively receives up-to-date information relating to the type and current performance of the communication connection, which information can then be taken into account when emitting the data stream.

In one particularly preferred embodiment of the method proposed according to the invention, the number of hops, that is to say the number of times the data stream is forwarded via a switch, along the communication connection between the sender and the recipient is counted as information relating to the network topology. If, as described above, each switch inserts information relating to the network topology and/or the resources of the switch into the reservation request and/or into the confirmation of the reservation request, each switch along the communication path or communication connection can easily increment a hop counter for this purpose until the reservation request reaches the recipient. This information is then sent back to the sender with the confirmation of the reservation request, said sender therefore having a measure of the length of the communication path. Alternatively or additionally, each switch may also add an identification to the reservation request and/or to the confirmation of the reservation request, from which identification the sender can count the number of hops along the communication path and can possibly evaluate further information relating to the switch since the switch used to forward the data stream is therefore known and has been identified.

Further, one aspect of to the invention also involves the sender statically predefining the number of hops in a substantially static communications network, in which the network subscribers are known and the communication connections (routes) from a defined sender to a defined recipient usually have the same structure, if the sender knows the topology of the network.

Another possibility according to the invention for carrying out the method provides for a switch, in particular each switch, along the communication connection from the sender to the recipient to reproduce an item of information relating to the number of queues that can be used to forward the data stream, the nominal performance of the queues, that is to say details of the current capacity of the queues in particular, and/or the queue level, that is to say the current utilization of queues in particular, as information relating to resources of the communication connection. On the basis of this information, the sender can then select a suitable quality of service, in particular by adapting the usage time (presentation time) and/or quality of service class parameters.

The number of queues that can be used to forward the data stream and the nominal performance of said queues in a switch can also be known in advance according to one aspect of the invention in the sender in a known network, that is to say with a known network topology, for example by storing them in a suitable table which can preferably be retrieved in the network. This information then no longer needs to be imperatively added to the reservation request and/or to the confirmation of the reservation request in order to be able to carry out the method according to the invention. Nevertheless, it is possible to update said data within the scope of a reservation request and/or the confirmation of the reservation request.

In particular in special closed systems, for example in a motor vehicle in which a particular basic utilization of the communications network is known, fixed data streams and their resource consumption can also be statically predefined according to the invention, with the result that they can be taken into account in any case by the sender even if this information is not concomitantly transmitted by the switches as part of a reservation request or an associated confirmation. In this context, provision may be made for the known topology of the network to be made available to the senders and/or recipients in the communications network when programming the network, preferably as static information, in particular while incorporating the communication subscribers in the network and/or when starting up the network. The known topology may contain, in particular, information relating to possible communication connections (routes, paths), the distance between all subscribers in the communications network, in particular along the possible communication connections, the distance between one subscriber and all other subscribers, the nominal performance of the switches (queues and storage levels of the queues, number of queues, fixed data streams and their resource consumption). The distance between the possible communication connections is preferably counted as the number of hops of the communication connections.

In this context, the invention may provide for tables to be created as a static configuration in the subscriber devices, that is to say in particular the senders or recipients referred to as end nodes and/or the switches, that is to say for the senders, in particular, to be statically informed of the quality of service on the basis of the fixed topology of the network, with the result that the senders can adapt the quality of service on the basis of the topology of the network and/or the resources of the communication connection even without the switches adding individual items of information, as described above in detail. However, it is preferred to have the available information dynamically adapted by the switches.

Furthermore, the invention may also provide for a central table, for example in a central control device, containing information relating to the topology of the network and/or the resources of the possible communication connections to be managed in the communications network, subscriber devices in the communications network being able to transmit the information to the table or place it there and read it from the table. These dynamically adaptable states may possibly be the current queue levels of the switches which are transmitted to the central table in the communications network by the switches. The senders can therefore retrieve this information via the subscriber devices along the communication connection without the information having to be emitted again for each reservation request, which possibly requires an increased amount of communication and data.

According to one particularly preferred embodiment, more than two quality of service classes may also be provided, each quality of service class being assigned, in particular, a queue in a switch with its own data rate in each case, that is to say a queue with a priority adapted to one of the quality of service classes in each case. Even if the current standard provides only two quality of service classes, the standard can be easily changed to more quality of service classes, possibly even without changing the standard as such, if the devices using the plurality of quality of service classes all use the standard within a closed network.

Accordingly, the invention also relates to a subscriber device in a communications network according to the invention, in particular of a motor vehicle, in which case the subscriber device may be, in particular, a sender, a recipient and/or a switch of the communications network. The subscriber device is provided with a transmitting/receiving device and a computing unit, the computing unit being set up to carry out communication in the communications network according to a communication protocol, in particular an Ethernet AVB transport protocol.

According to one aspect of the invention, the computing unit is also set up to carry out the above-described method or parts of the latter by program code. Accordingly, the present invention also relates to a computer program product having the program code which, when executed on a computing unit, is suitable for setting up the computing unit to carry out the method or parts of the latter.

BRIEF DESCRIPTION OF THE DRAWINGS

Further advantages, features and possible uses of the present invention also emerge from the following description of exemplary embodiments and the drawings. In this case, all described and/or depicted features per se or in any desired combination form the subject matter of the present invention, even irrespective of their combination in the claims or their dependency references. In the drawings:

DETAILED DESCRIPTION OF THE PRESENTLY PREFERRED EMBODIMENTS

Figure 1:
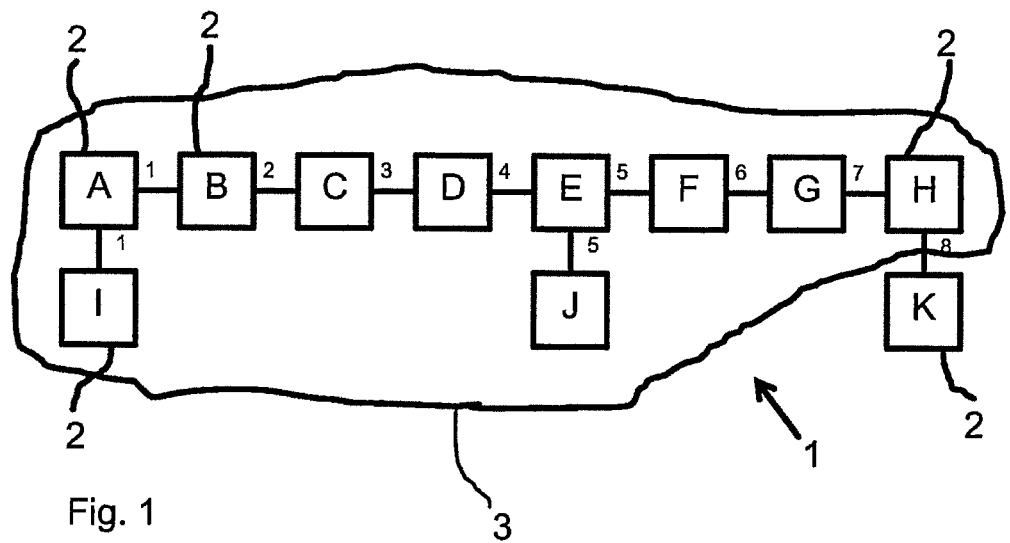
FIG. 1 is a packet-oriented communications network having communication connections

FIG. 1 illustrates a packet-oriented communications network 1 according to one embodiment the invention which operates, in particular, according to an Ethernet AVB standard (IEEE 802.1BA). The communications network 1 contains network subscribers 2 that are connected to one another in the communications network 1 and may be in the form of a sender, a recipient, and/or a switch for forwarding a data stream. In order to be able to individually name the individual network subscribers 2 below, they are marked with the capital letters "A" to "K". Starting from the network subscriber or node 2 forming the sender A in the described example, the connections (hops) which are needed for a data packet starting from the sender A to the respective recipients are numbered consecutively, in which case network subscribers 2 arranged between the sender A and a recipient H or K, for example, are in the form of switches which receive the data packets in the data stream and emit them again.

According to the Ethernet AVB standard, two network nodes 2, for which a data packet is intended to be transmitted within the scope of an Ethernet AVB standard, can be apart by a maximum of 7 intermediate transmissions which are also called hops. Therefore, the nodes 2 which can be reached by the sender A within this Ethernet AVB standard are within the so-called AVB cloud 3. A transmission within a predefined maximum transmission time is ensured for all subscriber devices 2 inside this AVB cloud 3. This maximum transmission time is no longer ensured for the network subscriber 2 with the designation "K" since a total of 7 hops (intermediate transmissions via switches) are required for this starting from the sender "A".

The present invention relates both to data connections inside the AVB cloud 3 and to data connections outside the AVB cloud 3 since the proposed method is equally possible for all of these connections. A preferred application is Ethernet AVB communication data networks inside a motor vehicle in which all network subscribers 2 are often inside the AVB cloud 3.

Figure 2:
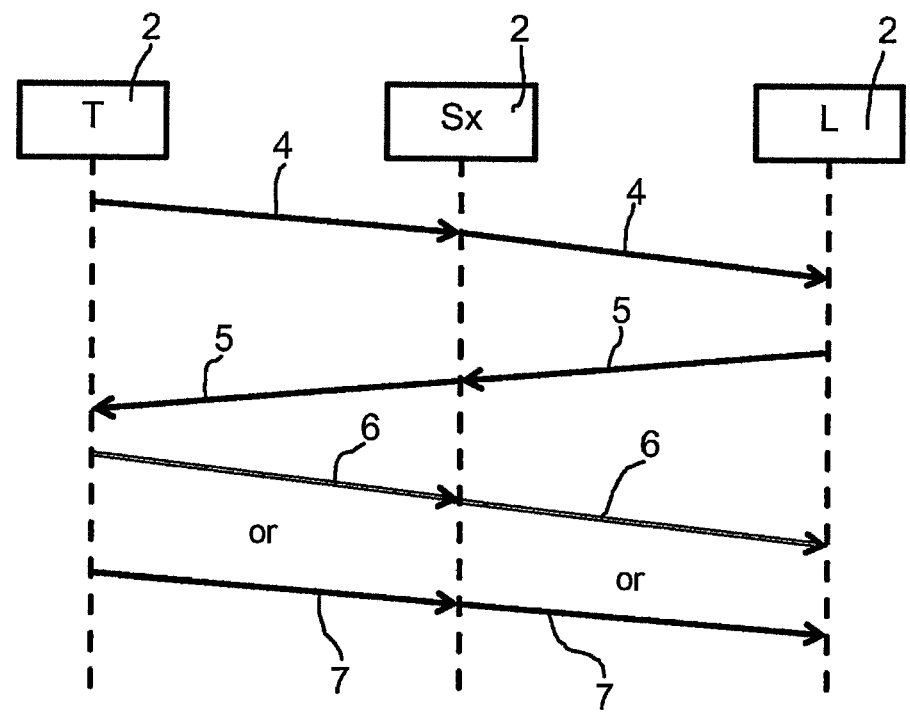
FIG. 2 is a temporal profile of a reservation request and a confirmation for a communications network according to FIG. 1.

The communication sequence in the communications network 1 according to one aspect of the invention is schematically illustrated below with reference to FIG. 2. In this case, a node 2 which is used as the sender and is marked with "T" (talker) in FIG. 2 emits a reservation request 4 either on account of its own instigation or on account of the reception of a request (not depicted) from a node 2, which is used as the recipient and is marked as "L" (listener) in FIG. 2, which reservation request is received by a network subscriber 2 used as a forwarding switch and is forwarded. The switch is marked with the letter "S" (switch) in FIG. 2, the letter "x" indicating that one or more switches S can be provided between the sender T and the recipient L.

The reservation request 4, which is used by the sender T to offer the streaming of a data stream, for example, contains parameters such as a quality class (QoS class), a data rate, a rank, and/or a transmission frequency. This reservation request 4 is received by the switch S, which checks whether the requested resources are still available. In the event of a positive check, the switch S forwards the message (reservation request 4) to the recipient L. The latter responds to the offer in the reservation request 4 and returns a confirmation 5 of the reservation request 4 if it would like to receive the data stream.

The switches S along the transmission connection from the sender T to the recipient L register the confirmation 5 of the reservation request 4 and reserve the quality requested with the reservation request 4 using settings in their internal queues, registers, etc. If the sender T therefore receives a positive confirmation of its reservation request, it can begin to transmit the data stream 6 which is transmitted to the recipient L on the reserved transmission path via the switches Sx.

The quality of service (QoS) requested by the sender T is available along the communication path (route, communication connection) on account of the reservation. This ensures a defined maximum delay of the data stream during transmission from the sender "T" to the recipient "L", which delay is also called latency. If the sender 2 does not receive a confirmation or receives a negative confirmation, it emits an error message 7 instead of transmitting the data stream 6.

This procedure corresponds to data transmission according to the Ethernet AVB standard. In this current Ethernet AVB standard, a maximum delay of approximately 250 µs for the data transmission by a network node (sender or switch) is assumed. With the maximum of eight network nodes 2 allowed inside an AVB cloud, that is to say a transmission from the sender to the recipient with a maximum of eight subscribers (including the sender), a maximum delay of 2 ms results in this case for the AVB QoS class A, to which the data packets are subjected on their transmission path via actually 7 hops (connections).

This shall be explained again below using a transmission of data in the communications network 1 illustrated in FIG. 1, the data being emitted by the network node 2 with the designation A (sender T). Recipients L are intended to be the network nodes 2 with the designation "I" and the designation "K", the network node 2 with the designation "K" being outside the AVB cloud 3. The data is intended to be processed in a temporally synchronized manner in the devices I and K according to the synchronously operating Ethernet AVB standard.

For example, the devices I and K (network nodes 2) may be loudspeakers intended to reproduce the data signal transmitted via the Ethernet AVB communications network 1 at exactly the same time since it would otherwise result in distortion of the audio signals.

The device I is directly connected to the sender (device A), with the result that a transmission with only one hop is required for this purpose. This is associated with a maximum delay of 250 μs.

The device K marks the end of the AVB cloud as the first device, which is outside the AVB cloud. Eight nodes at 250 μs, that is to say a total of 2 ms, should be planned for a data transmission here since the delay of the data may be this long.

If the data is intended to be played back at the same time, the data must be buffered in the device I for the corresponding difference in the actual transmission time until the device K has also received the data, with the result that the data can then be processed, for example played back by the loudspeakers, at the same time.

Since all devices inside an AVB cloud 3 are synchronized with one another, recipients that are at different distances away from one another can also reproduce the received data at the same time.

Figure 3:
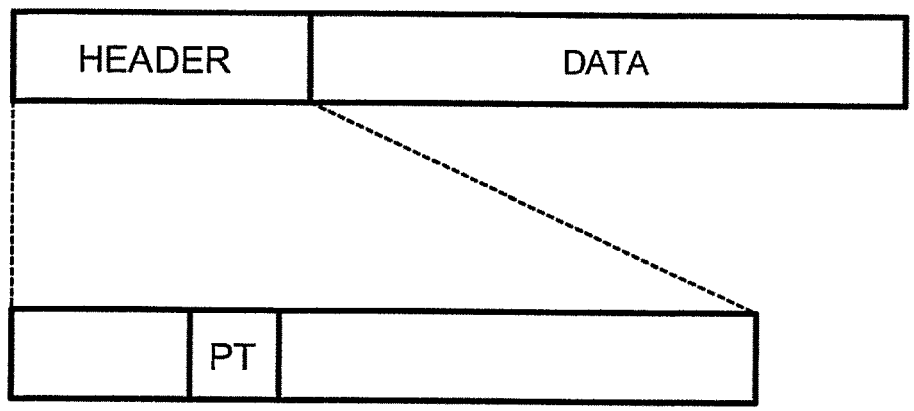
FIG. 3 is a structure of a header of a data packet transmitted in the communications network according to FIG. 1.

In order to control this, the data packet, which is illustrated in FIG. 3, is transmitted in the communications network 1 according to the Ethernet AVB standard or a corresponding standard is divided into a so-called data header (header) and a data part (data). In addition to other information, such as control data for the communication sequence and the like, the header contains an entry for a usage time (presentation time PT) which indicates when the received data can be used within the synchronous time of the synchronized subscriber devices 2.

Figure 4:
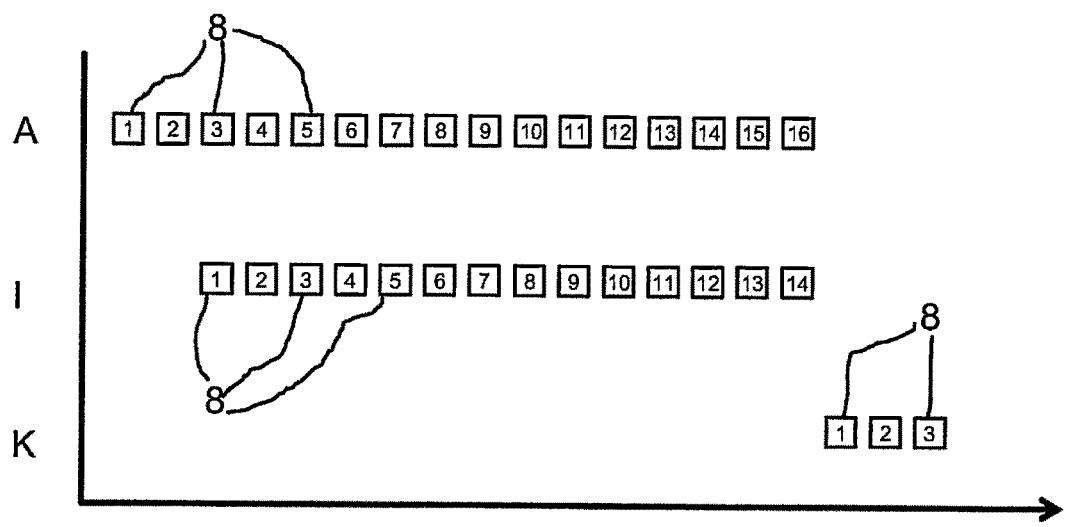
FIG. 4 is a temporal profile of the propagation of data packets through the communications network according to FIG. 1.

Since the data packets are transmitted relatively quickly from the device A to the device I, but the transmission from the device A to the device K takes considerably longer, a different storage requirement results in the devices I and K. This is illustrated in FIG. 4.

On account of the topology of the communications network 1, the different recipients, the devices I and K in the example, receive the data packets at different times. If the device A emits a total of sixteen data packets 8 with a typical transmission interval of 125 μs (uppermost row of FIG. 3) and the data transmission via a node takes 250 μs, the device I receives the first data packet 8 at the time at which the data packet 3 is emitted by the sender T (device A). Since the other recipient (device K) is eight hops away, it receives the first data packet 8, which was emitted by the device A, only after the emission of the sixteenth data packet by the device A.

Figure 5:
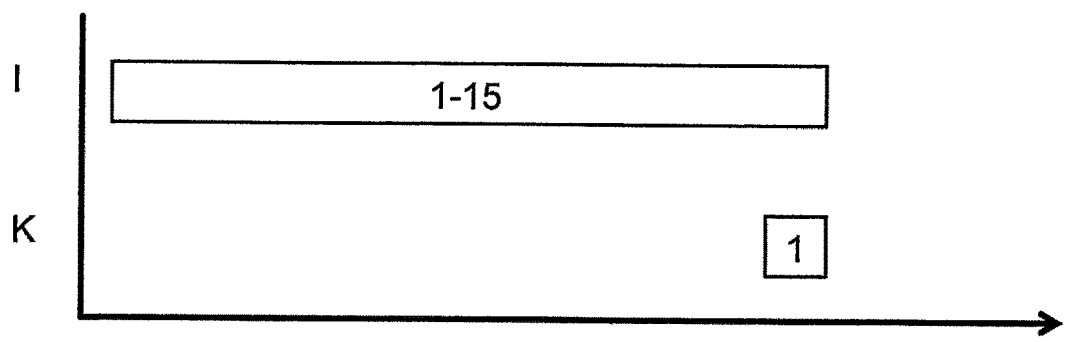
FIG. 5 is a memory state of subscriber devices in the communications network according to FIG. 1 before the received data are processed further.

Since the data is intended to be processed at the same time in the devices I and K, it is therefore necessary to store fifteen data packets in the device I so that the data packets 8 received at different times are actually processed at the same time. This is also qualitatively illustrated by FIG. 5 which shows the storage requirement of the devices I and K over time, in which case only one data packet has to be buffered in device K, but fifteen data packets have to be buffered in device I for the example according to FIG. 4.

As the following table shows, a considerable storage requirement may arise here, in particular when transmitting video data, which storage requirement is directly associated with the costs for the memory modules and therefore the network subscribers 2. The following table 1 compares the number of video data packets 8 in the memory with a storage requirement in bytes.

TABLE 1

| Data packets in the memory | Storage requirement in bytes |
| --- | --- |
| 1 | 1500 |
| 2 | 3000 |
| 3 | 4500 |
| ... | ... |
| 16 | 24000 |

However, on account of the maximum transmission times of 2 ms and 50 ms guaranteed by the AVB classes A and B, the situation also occurs in which data packets are emitted to a recipient and a usage time PT of 2 ms or 50 ms is entered in the header of the data packet, corresponding to the guaranteed transmission time, irrespective of how long the data packet actually needs to get from the sender T to the recipient L since the data packet has reached the recipient L in any case inside these guaranteed times.

This may also result in an increased storage requirement in the recipient if the data packets arrive at the recipient considerably earlier than when they can then be used according to the usage time. This is illustrated in the following tables 2 and 3 for the usage times of 2 ms and 50 ms and the distances to the recipient in hops (intermediate transmissions), in which case the latency for the actual transmission is stated as the latency time to the recipient and the latency for further processing of the data is stated as the latency time to use.

TABLE 2

| Distance (hops) | Usage time | Latency to the recipient | Latency to use |
| --- | --- | --- | --- |
| 1 | 2 ms | 0.25 ms | 2 ms |
| 2 | 2 ms | 0.5 ms | 2 ms |
| 3 | 2 ms | 0.75 ms | 2 ms |
| 4 | 2 ms | 1 ms | 2 ms |
| 5 | 2 ms | 1.25 ms | 2 ms |
| 6 | 2 ms | 1.5 ms | 2 ms |
| 7 | 2 ms | 1.75 ms | 2 ms |
| 8 | 2 ms | 2 ms | 2 ms |

The latency to use here is the actually minimum time until the data can be processed further. Irrespective of the distance from the recipient, the minimum latency time to use cannot be less than 2 ms according to class A and 50 ms according to class B since otherwise the standard is not complied with. In the case of only one hop to the recipient, that is to say a direct transmission of the data from the sender to the recipient without the interposition of a switch, the data must be buffered in the recipient for 1.75 ms (in the case of class A) or 43.75 ms (in the case of class B) before processing is possible.

TABLE 3

| Distance (hops) | Usage time | Latency to the recipient | Latency to use |
|---|---|---|---|
| 1 | 50 ms | 6.25 ms | 50 ms |
| 2 | 50 ms | 12.5 ms | 50 ms |
| 3 | 50 ms | 18.75 ms | 50 ms |
| 4 | 50 ms | 25 ms | 50 ms |
| 5 | 50 ms | 31.25 ms | 50 ms |
| 6 | 50 ms | 37.5 ms | 50 ms |
| 7 | 50 ms | 43.75 ms | 50 ms |
| 8 | 50 ms | 50 ms | 50 ms |

Figure 6:
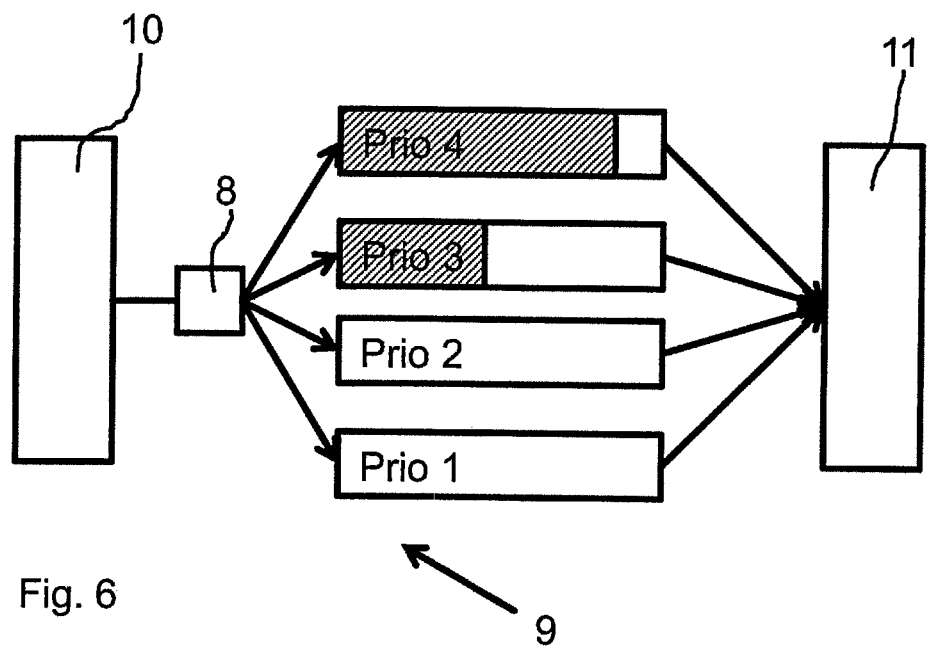
FIG. 6 is a forwarding of data packets by switches in the communications network according to FIG. 1.

Another problem within the scope of the existing Ethernet AVB standard is constituted by the available, limited resources for forwarding data messages in switches or their queues. A high priority can be selected only for a certain number of data streams. If the limited number of data streams is exhausted, no further data can be transmitted by the switch with the required quality. This is explained below using FIG. 6 which illustrates the method of operation of a switch 9 in a simplified manner.

As soon as a data packet 8 has been received via the input port 10 of the switch 9, a check is carried out, according to the quality (QoS, Quality of Service) associated with the data packet 8 or the data stream containing the data packet 8, in order to determine the queue (processing stack) in the switch 9 into which the data packet 8 is placed. Within the scope of the Ethernet AVB standard in which a maximum transmission duration is used for a data packet, only the two queues with the highest priority Prio4 and Prio3 are usually used, with the result that the switches often also have only two queues unlike in the situation illustrated by way of example. Even in the case of a plurality of queues, the lower-priority queues (Prio1 and Prio2) are usually not used for data transmission within the scope of the Ethernet AVB standard but rather for general, non-time-critical data transmissions.

The different priorities Prio1 to Prio4 have the sense of controlling the forwarding of the data packets according to their importance. The queues Prio1 to Prio4 are not handled at the same time or with equal rights, but rather the important queues with a higher priority are preferentially handled. Data packets 8, which are sorted into the queue with the highest priority Prio 4, are forwarded to the output port 11 more quickly than data packets 8 sorted into lower queues.

The number of four queues illustrated here is selected by way of example and differs depending on the manufacturer of the switches 9. In the example illustrated in FIG. 6, the queue Prio 4 with the highest priority is already virtually completely occupied (dashed region), with the result that scarcely any more new data can be included. When the queue with the highest priority Prio 4 is occupied, the switch 9 can no longer positively answer data requests, with the result that a delay in the transmission of data may result overall by virtue of the fact that reservation requests 4 are negatively answered on account of the queue occupation in the switches 9.

In the case of the situation depicted with regard to FIG. 1 and in which data is intended to be transmitted from the sender T (device A) to the recipients L (device I and device K) and are intended to be processed there at the same time, the data packets from the device A are each sorted into the queue with the highest priority Prio4 according to the conventional Ethernet AVB standard irrespective of the distance of the communication connection since said data packets are recognized as data according to the AVB standard and are therefore handled in the switches with the highest priority.

Since an additional delay is scarcely produced by the interposition of switches for the communication connection from device A to device I, which is directly connected to device A, the use of the queue with the highest priority Prio4 is superfluous. This gives away resources which would possibly be required by other data streams, for example from device H to device I, because the data stream in this case has to be transported over a very long distance and the queue with the highest priority Prio4 should be selected in order to achieve the maximum delay of 250 µs per node.

Alternatively, only 2 ms (class A) or 50 ms (class B) can be set as the usage time with the current Ethernet AVB standard. This means that the data packets 8 have already reached the recipient L in many cases, in particular in fewer than 7 hops, but still have to wait until they become valid due to the usage time (presentation time) conservatively estimated according to the standard. In particular during use in motor vehicles in which, for example, 3 hops rather than 7 hops can often be expected for data transmission, packets will always have to be buffered, as a result of which quality resources (QoS) are wasted and unnecessary latencies occur during data transmission.

In communications networks in a vehicle, data streams that require a certain quality are usually transported in the MOST and FlexRay networks. The new Ethernet AVB standard, which likewise achieves a temporally defined and synchronized transmission of data packets in data streams, competes with these two networks in motor vehicles and should also support at least the quality requirements with regard to latency times and message jitter for data transport when used in a motor vehicle. This is not possible with the Ethernet AVB standard, which is currently in use and was developed primarily for professional audio/video transmission technology, for example in hi-fi studios, and has considerably lower requirements with regard to the costs of the memory modules than use in motor vehicles.

The method proposed according to one aspect of the invention provides for the quality of service of the data stream to be adapted by the sender T on the basis of the topology of the communications network 1 and/or the resources of the communication connection. It is therefore proposed to adapt the quality of service of the data streams on the basis of the topology of the network and specifically on the basis of the communication connection (route) for the data from the sender to the recipient. The quality of service of the data streams can be accordingly adapted on the basis of the parameters of the topology and the available resources of the switches 9 between the sender T and the recipient S using suitable parameters. Even if the Ethernet AVB standard currently offers only 2 quality classes (AVB classes A and B), the present invention proposes the practice of no longer being coupled to these two classes but rather being able to offer individual parameters that can also be easily enforced in this standard if necessary if further parameters are introduced on the basis of the existing standard, with all of the network subscribers 2 installed in the motor vehicle having said parameters, for example. For the rest, the standard can also be readily adapted since only additional parameters are offered which do not necessarily have to be used and would therefore also be compatible with older devices of the Ethernet AVB standard.

According to one aspect of the invention, the information relating to the topology and the resources of the switches can be dynamically determined or statically disclosed. This is already possible as a result of the protocols in the standard.

The proposed solution therefore makes it possible to be able to offer the Ethernet AVB standard and network device components for the latter more favorably in the motor vehicle sector by virtue of the quality parameters adapted to the respective communication connection (route) and to the current queue states of the switches 9 helping to save or minimize expensive resources such as memory modules or processors. Furthermore, the latency times can be minimized since the data streams can be processed more quickly overall. For example, it is then no longer necessary to wait for a minimum latency time of 2 ms (minimum processing time according to the AVB class A) until the transmitted data packets become valid since the adaptation proposed according to the invention makes it possible to set the communication connection in such a manner that the data packets arrive in the recipient in line with the processing time and at best must be buffered for a short time. Therefore, more than two quality classes can be offered to the superordinate application, with the result that it is easier to support real-time applications using this network technology.

Furthermore, the adaptation of the quality affects the overall quality (QoS) of the AVB cloud, which makes it possible to use resources that have not been used or have been wasted. If, for example, a queue with a higher priority is used in a switch, a decision can be made after retrieving the topology information, that is to say in particular the number of hops along the communication connection, as regards whether a slower queue with a lower priority should be used if this is sufficient for the requested data stream. The higher-quality queue remains open for more time-critical transmissions and is not blocked so quickly.

According to one embodiment which is advantageous according to the invention, the quality of service of the data stream can be set by the sender using parameters, in which case the usage time (presentation time) and a quality of service class (QoS class), which possibly extends the currently available AVB classes A and B, for example, lend themselves as suitable parameters of the quality of service (QoS parameters) of the datastream. The usage time (presentation time) resorts, in particular, to the topology of the communications network 1 as a parameter and is decisively determined by the number of hops along the communication connection which are needed to transport data from a sender T to a recipient L. The usage time parameter immediately influences the necessary memory in the recipient which can be considerably reduced by a usage time accordingly adapted to the length of the communication connection since longer buffering times for the data are not required.

In comparison with a standard having only two guaranteed latencies, the latency is also improved by the inventive adaptation of the residence time to the topology of the network since it is no longer necessary to wait for the guaranteed transmission time before further processing.

The quality of service class substantially depends on the queues used in the switches, in which case both the number of queues available in the switch and the utilization of the queues (queue state) can be taken into account by the sender when determining a suitable quality of service class for a data stream. As a result, better use is made of the properties of that part of the communications network (for example the AVB cloud) which is specifically used to transmit the data. Within the scope of a static configuration, all network subscribers 2 can be provided with the topology of the communications network 1 including communication connections (hop), distance to all other network subscribers 2, storage levels, fixed data streams and their resource consumption either when programming the network or when respectively starting up the network. For this purpose, suitable tables, for example, can be created in the network subscribers 2, in particular the end nodes used as the sender T and the recipient L and the switches S used as intermediate nodes, said tables containing the information.

If a data stream is then transmitted with a quality of service guarantee, the quality parameters can be adapted on the basis of the information stored in the table.

Figure 7:
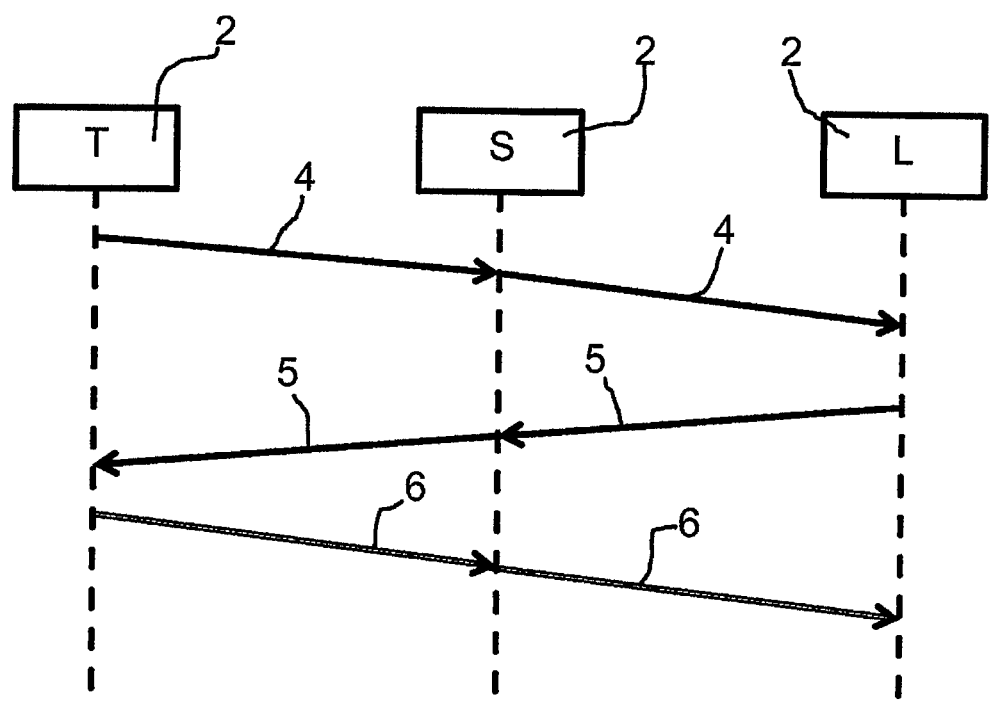
FIG. 7 is a temporal profile of the reservation and adaptation of the quality of service.

FIG. 7 illustrates an example of dynamic fetching of parameters according to the method proposed according to one aspect of the invention. In the example described according to FIG. 7, a network node 2 used as the sender T offers a data stream with a particular quality of service guarantee by a reservation request 4 which is received by a node 2 used as a switch S. The switch S or all switches S between the sender T and the recipient L extend(s) the parameters entered in the reservation request 4 by the sender by the distance covered (by counting the hops or the like) and/or by the existing reservations that restrict the resources of the switch, for example. The reservation requests 4 accordingly extended in this manner reach the recipient L that positively confirms reception if it would like to receive the data stream and has sufficient resources available for reception and/or processing. The reservation requests 4 supplemented with the information from the switches S are returned by the recipient L, which is likewise a node 2 in the communications network 1, as a confirmation 5 of the reservation request 4 by the switches S to the sender T, which can use the information contained therein to determine the actual communication connection (route, path) to the recipient L and can accordingly adapt the quality parameters of the data stream. The data stream 6 is then transmitted using these adapted quality parameters.

More complex scenarios in which a plurality of recipients L1, L2 are intended to synchronously process the received data stream are also conceivable within the scope of the invention. In this case, in response to the reservation requests 4, the sender receives back the respective confirmations 5, which have been supplemented with the parameters of the switches, from the two recipients L1 and L2 and can therefore transmit two different data streams with a respective adapted quality of service, which data streams preferably arrive at the recipients L1 and L2 at approximately the same time, with the result that these data can be quickly processed without relatively great or relatively long-lasting buffering as shown in FIG. 8.

Figure 8:
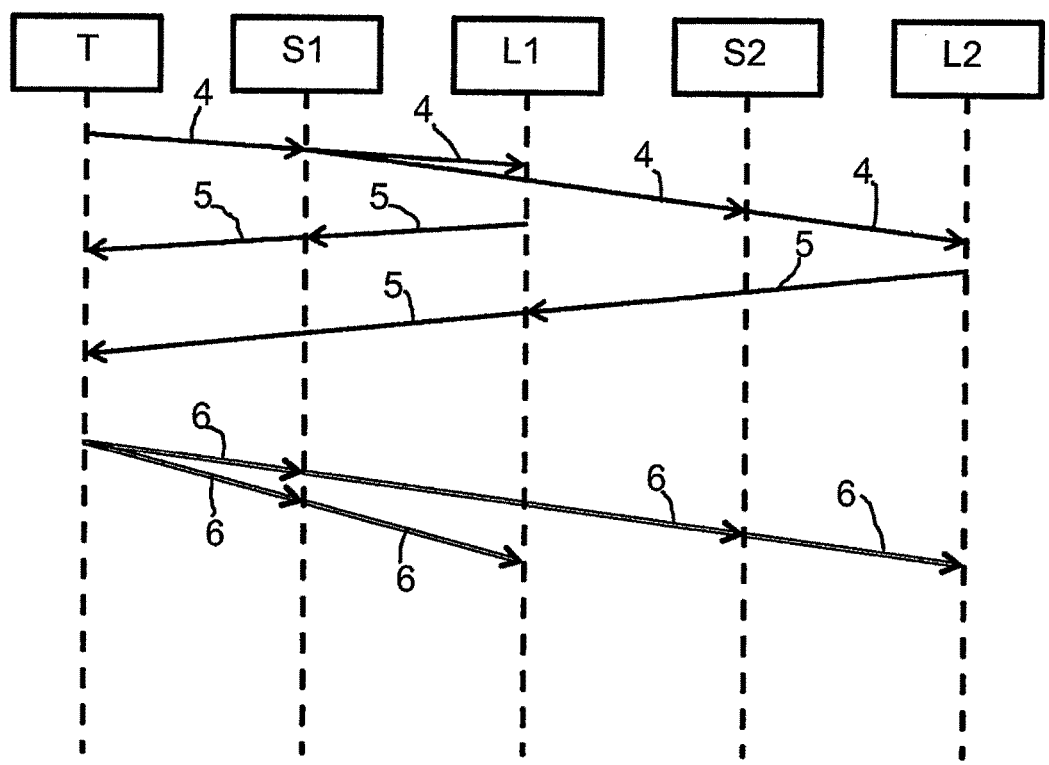
FIG. 8 is a temporal profile of the reservation and adaptation of the quality of service.

In accordance with the illustration in FIGS. 7 and 8, the topology and the resource data from the individual switches S are each updated as the reservation request 4 and/or the confirmations 5 pass(es) through, with the result that the dynamically updated parameters are respectively available to the sender T when emitting the data stream.

The advantages achieved thereby according to the invention also emerge from tables 4 and 5 which are illustrated below and illustrate the processing time adapted according to the topology and the resources and the latency time to use.

TABLE 4

| Distance (hops) | Usage time | Latency to the recipient | Latency to use |
|---|---|---|---|
| 1 | 0.25 ms | 0.25 ms | 0.25 ms |
| 2 | 0.5 ms | 0.5 ms | 0.5 ms |
| 3 | 0.75 ms | 0.75 ms | 0.75 ms |

TABLE 4-continued

| Distance (hops) | Usage time | Latency to the recipient | Latency to use |
|---|---|---|---|
| 4 | 1 ms | 1 ms | 1 ms |
| 5 | 1.25 ms | 1.25 ms | 1.25 ms |
| 6 | 1.5 ms | 1.5 ms | 1.5 ms |
| 7 | 1.75 ms | 1.75 ms | 1.75 ms |
| 8 | 2 ms | 2 ms | 2 ms |

TABLE 5

| Distance (hops) | Usage time | Latency to the recipient | Latency to use |
|---|---|---|---|
| 1 | 6.25 ms | 6.25 ms | 6.25 ms |
| 2 | 12.5 ms | 12.5 ms | 12.5 ms |
| 3 | 18.75 ms | 18.75 ms | 18.75 ms |
| 4 | 25 ms | 25 ms | 25 ms |
| 5 | 31.25 ms | 31.25 ms | 31.25 ms |
| 6 | 37.5 ms | 37.5 ms | 37.5 ms |
| 7 | 43.75 ms | 43.75 ms | 43.75 ms |
| 8 | 50 ms | 50 ms | 50 ms |

In comparison with tables 2 and 3, the distance (as the sum of hops) is considered as a parameter for the residence time designed to be a multiple of the base of the transmission time of a hop (0.25 ms in the example). The transmission time to the respective recipient (latency time to the recipient) remains the same corresponding to the distance to the recipient in hops. However, a data packet is processed much more quickly as a result of the adapted usage time, with the result that a minimum latency of 2 ms according to the standard can be shortened to an eighth, for example, if only one hop is needed for transmission.

A corresponding situation emerges from table 5 for the latency time of the AVB class B.

However, the invention is not restricted to the above-described data in the table since it is possible to define, in particular, further QoS classes which allow substantially finer matching of the latencies to the topology and resources of the communications network 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transmitting a data stream of data in a packet-oriented communications network with a guaranteed maximum transmission time for first data packets in the communications network, comprising:
    reserving a certain quality of service before data transmission using a reservation request from a sender of the data to a recipient of the data by issuing a reservation request and receiving a confirmation for a communication connection, the reservation request comprising, a data rate of the data stream and a latency as parameters of quality of service for the communication connection between the sender and the recipient, wherein the quality of service is guaranteed for the data stream in the event of a confirmation of the reservation request;
    checking, based at least in part on conditions of the communication connection, a required quality of service of the data before the data is transmitted; and
    adapting the certain quality of service of the data stream to the required quality of service of the data stream by the sender based on a topology of the communications network,
    wherein the communications network is synchronized only in a part of the communications network along the communication connection from the sender of the data to the recipient of the data, to process data packets emitted to the recipient and a second recipient at a same time,
    wherein the parameter of the required quality of service of the data stream comprises a usage time, wherein the usage time indicates a time from which the data transmitted in the data stream via the communications network can be used in the recipient.

2. The method as claimed in claim 1, wherein a quality of service class is adapted as the parameter of the required quality of service of the data stream.

3. The method as claimed in claim 2, wherein the communication connection between the sender and the recipient is effected via at least one switch using a respective hop, the switch receiving the data stream, placing the data stream in a queue according to a prioritization, and emitting the data stream when processing the queue,
    wherein the switch inserts into at least one of the reservation request and the confirmation of the reservation request information relating to at least one of:
    network topology, and
    resources of the switch,
        wherein the information relating to the network topology and the resources of the switch is transmitted to the sender with the confirmation of the reservation request, and
        wherein the sender adapts the certain quality of service of the data stream based at least in part on the at least one of transmitted information relating to the network topology and the resources of the switch.

4. The method as claimed in claim 3, wherein a number of hops along the communication connection from the recipient to the sender is counted as information relating to the network topology.

5. The method as claimed in claim 3, wherein a switch along the communication connection from the sender to the recipient reproduces an item of information relating to the number of queues which can be used to forward the data stream, the nominal performance of the queues and/or the queue level as information relating to resources of the communication connection.

6. The method as claimed in claim 3, wherein the topology of the communications network is made available to at least one of the sender and the recipient in the communications network when programming or when starting up the communications network.

7. The method as claimed in claim 2, wherein more than two quality of service classes are provided, each quality of service class being assigned a queue in a switch with a respective data rate.

8. The method as claimed in claim 1, wherein a central table contains information relating to a topology of the communications network or resources of the communication connection and is managed in the communications network, wherein a subscriber device in the communications network is configured to transmit the information to the table and read the information from the table.

9. The method as claimed in claim 1, wherein the packet-oriented communications network is according to the Ethernet-AVB-Standard IEEE 802.1BA and the communications network is in a motor vehicle.

10. A subscriber device in a communications network, having a transmitting/receiving device and a computing unit, the computing unit being set up to carry out communication in the communications network according to a communication protocol, wherein the computing unit is set up to carry out by program code the method of
reserving a certain quality of service before data transmission of a data stream using a reservation request from a sender of the data to a recipient of the data by issuing a reservation request and receiving a confirmation for a communication connection, the reservation request comprising parameters of the requested quality of service, as a data rate of the data stream and a latency for the communication connection between the sender and the recipient, wherein the quality of service is guaranteed for the data stream in the event of a confirmation of the reservation request;
checking, based at least in part on conditions of the communication connection, a required quality of service of the data before the data is transmitted; and
adapting the certain quality of service of the data stream to the required quality of service of the data stream by the sender based on a topology of the communications network,
wherein the communications network is synchronized only in a part of the communications network along the communication connection from the sender of the data to the recipient of the data, to process data packets emitted to the recipient and a second recipient at a same time,
wherein the parameter of the required quality of service of the data stream comprises a usage time, wherein the usage time indicates a time from which the data transmitted in the data stream via the communications network can be used in the recipient.

11. The subscriber device of claim 10, wherein the subscriber device is at least one of the sender, the recipient, and a switch of the communications network.

12. A computer program product having program code which, when executed on a computing unit, are suitable for setting up the computing unit to carry out the method of:
reserving a certain quality of service before data transmission of a data stream using a reservation request from a sender of the data to a recipient of the data by issuing a reservation request and receiving a confirmation for a communication connection, the reservation request comprising parameters of the requested quality of service as a data rate of the data stream and a latency the communication connection between the sender and the recipient, wherein the quality of service is guaranteed for the data stream in the event of a confirmation of the reservation request;
checking, based at least in part on conditions of the communication connection, a required quality of service of the data before the data is transmitted; and
adapting the certain quality of service of the data stream to the required quality of service of the data stream by the sender based on a topology of the communications network,
wherein the communications network is synchronized only in a part of the communications network along the communication connection from the sender of the data to the recipient of the data, to process data packets emitted to the recipient and a second recipient at a same time,
wherein the parameter of the required quality of service of the data stream comprises a usage time, wherein the usage time indicates a time from which the data transmitted in the data stream via the communications network can be used in the recipient.

* * * * *